United States Patent [19]

Matsumura et al.

[11] Patent Number: 5,471,394
[45] Date of Patent: Nov. 28, 1995

[54] METHOD FOR DEFINING MACHINING AREAS OF A WORKPIECE

[75] Inventors: Teruyuki Matsumura, Hachioji; Masatoshi Nakajima, Yamanashi, both of Japan

[73] Assignee: Fanuc Ltd., Yamanashi, Japan

[21] Appl. No.: 157,064

[22] PCT Filed: Apr. 21, 1993

[86] PCT No.: PCT/JP93/00519

§ 371 Date: Dec. 7, 1993

§ 102(e) Date: Dec. 7, 1993

[87] PCT Pub. No.: WO93/21570

PCT Pub. Date: Oct. 28, 1993

[30] Foreign Application Priority Data

Apr. 22, 1992 [JP] Japan .................................. 4-102915

[51] Int. Cl.[6] .................................................. G06F 15/46
[52] U.S. Cl. .............................. 364/474.26; 364/474.21; 364/474.22
[58] Field of Search ................. 364/474.24, 474.26, 364/188–191, 474.21, 474.22, 474.23, 146

[56] References Cited

U.S. PATENT DOCUMENTS

| | | | |
|---|---|---|---|
| 5,313,402 | 5/1994 | Ito .................................... | 364/474.26 |
| 5,315,525 | 5/1994 | Bluthgen et al. ................ | 364/474.26 |
| 5,317,519 | 5/1994 | Maeda .............................. | 364/474.26 |
| 5,327,350 | 7/1994 | Endo ................................. | 364/474.26 |

FOREIGN PATENT DOCUMENTS

| | | |
|---|---|---|
| 0145934A2 | 6/1985 | European Pat. Off. . |
| 0177655A1 | 4/1986 | European Pat. Off. . |
| 0310106A2 | 4/1989 | European Pat. Off. . |
| 58-163009 | 9/1983 | Japan . |
| 62-119608 | 5/1987 | Japan . |
| 63-167905 | 7/1988 | Japan . |
| 1-19411 | 1/1989 | Japan . |
| 3-58708 | 6/1991 | Japan . |

OTHER PUBLICATIONS

"Expert System for Metal Machining Practice", PFEIFFER et al, Technische Mitteilungen Krupp, No. 2, Nov. 1988, pp. 113–124.

Primary Examiner—Roy N. Envall, Jr.
Assistant Examiner—Thomas E. Brown
Attorney, Agent, or Firm—Nikaido, Marmelstein, Murray & Oram

[57] ABSTRACT

A method for defining machining areas of a workpiece by means of a CRT screen display in an interactive system for creating a program for NC machining includes the steps of providing a first display of a workpiece before machining including a designated area to be machined, providing a second display identifying a first area to be machined and, after programming a first machining operation, providing a third display representing overlapped views of the first and second displays so that uncut areas of the workpiece requiring further machining operations can easily be identified. A check is made by comparing previous displays to assure that identified uncut areas exist, and candidate tools are shown in the display to provide easy selection.

3 Claims, 6 Drawing Sheets

METHOD FOR DEFINING MACHINING AREAS OF A WORKPIECE

TECHNICAL FIELD

The present invention relates to a method for NC programming by means of an interactive computer system, more particularly, to a method for defining machining areas of a workpiece in a CRT screen display for creating an NC program used with turning machines (lathes).

BACKGROUND ART

In a prior art, the shape of a whole workpiece to be machined and the area to be machined, namely the designated machining area, were displayed in a screen on a CRT display unit when an operator created an NC program, used with turning machines, by means of an interactive computer system. The area to be actually machined in each machining operation by a designated tool is displayed in another screen on the CRT unit.

FIG. 1 shows a screen displaying the shape of a whole workpiece and a designated machining area in the workpiece. In the drawing, the outline of a section of the workpiece which is going to be machined is shown by a broken line, while the designated machining area is shown by a continuous thick line. The area to be actually machined, namely the area to be removed from the whole workpiece is the area less the designated machining area plus finishing stock (not shown) which is left for finishing processes from the whole workpiece. Black squares at points A and B indicate the points at which the machining area is designated. Arrows at points A and B indicate cutter feed direction for machining the workpiece. When the arrow at point B points straight up in the drawing, the designated machining area is the area 11 indicated with oblique hatched lines as shown in the drawing. When the arrow at point B points toward the upper left of the drawing, the designated machining area is the hatched area 11 plus the dotted area 12 as shown in the drawing. By the way, machining a workpiece, here, is carried out by chucking the workpiece on a spindle unit in a machine tool, turning the spindle around the Z axis and feeding a bite 1 in at least one of the directions X or Z as shown in the drawing.

FIG. 2 shows a screen displaying a designated machining area and an outline of a workpiece before machining the workpiece by designated tool No. 1. In the drawing, TX and TZ indicate the finishing stock, namely the width of stock to be left after completion of the machining of the workpiece in the directions X and Z respectively. The designated machining area shown by a continuous thick line plus the finishing stock is the desired shape of a part after the completion of the first machining of the workpiece. However, the actual shape of the workpiece after the machining by the designated tool No. 1 under conditions concerning, for example, the finishing stock, the cutting conditions for the tool or the like is as shown by a continuous thin line. It can be understood from the drawing that there are some uncut areas when the shape shown by the continuous thin line is compared with the desired shape of the workpiece shown by the thick line. In order to machine the workpiece to a desired finished shape, it is necessary to find the uncut area by comparing two screens shown by FIG. 1 and FIG. 2 and to machine the found uncut area by means of another tool. The process for accomplishing this will be explained below.

FIG. 3 shows a screen displaying a designated machining area of a workpiece after completion of the first machining by the designated tool No. 1 and the shape of the machining area to be machined by the designated tool No. 2. This screen is displayed when an operator creating an NC program designates the area to be machined and the tool for machining the same area before machining an uncut area which is left after completion of the machining by the designated tool No. 1. In the drawing, the hatched area indicates a first portion of the uncut area which could not be machined by the designated tool No. 1. Black squares at points C and D indicate the points for designating machining areas, and arrows at the points C and D indicate cutter feed directions for machining the workpiece. After inspecting the new shape for machining the designated machining area, the designated tool No. 2 will be selected.

FIG. 4 shows a screen displaying a designated machining area of a workpiece after completion of the first machining by the designated tool No. 1 and the second machining by the designated tool No. 2, and the shape of a second uncut portion of the machining area to be machined by the designated tool No. 3. This screen is displayed when an operator designates the area to be machined and the tool for machining the same area before machining an uncut area which is left after completion of the machining by the designated tools No. 1 and No. 2. In the drawing, the hatched area indicates the uncut area which could not be machined by the designated tools No. 1 and No. 2. Black squares at points E and F indicate the points for designating machining areas, and arrows at the points E and F indicate cutter feed direction for machining the workpiece. After inspecting the new shape for machining the designated machining area, the designated tool No. 3, using for grooving, will be selected.

As heretofore explained, the method for defining machining areas of a workpiece in a CRT screen display of the prior art has a problem in that the area actually completed by the machining is unclear because the screen according to prior art does not show an overlapped view of the shape of the whole workpiece before machining and the shape of the workpiece after completion of the machining for each designated machining area by the designated tool.

DISCLOSURE OF THE INVENTION

Therefore, in the light of the above mentioned problem, it is an object of the present invention to provide a method for defining machining areas of a workpiece by means of a CRT screen display that gives an overlapped view of a whole workpiece shape, the designated machining area for each machining step, the shape of the workpiece after completion of the machining for the designated machining area by the designated tool and the uncut area, and that also provides a screen displaying candidate tools which may be optimum for the next machining of the workpiece, whereby operators can obviously recognize the uncut area.

FIG. 5 shows a flow chart of a basic process of a method for defining machining areas of a workpiece in a CRT screen display according to the present invention. The method of the present invention to carry out the above identified object includes the following steps when an operator designates machining areas and tools for machining the designated machining areas.

The first step: Designated machining areas are displayed in a screen. (Refer to FIG. 6)

The second step: The shape of the real machining area for machining the designated machining areas by the designated tools are displayed. (Refer to FIG. 7)

The third step: An overlapped view of the shapes of the designated machining areas obtained in the first step with the shape of the real machining areas obtained in the second step are displayed. (Refer to FIG. 8)

The fourth step: Candidate tools for machining the uncut areas after checking whether or not the uncut area exists in accordance with the result of the third step, in which the uncut area is the area in the designated machining area which is left after machining by the designated tools are displayed. (Refer to FIG. 8)

The method of the present invention further includes the steps of selecting a line attribute such as a continuous line, a broken line or the like, or colors of lines, or colors or raster patterns for drawing area surrounded by lines in order to discriminate the shape of the designated area, the actual machining area to be machined by designated tools and the uncut area, whereby operators can easily distinguish the boundary, and displaying the designated area.

The method of the present invention further includes a step of displaying candidate tools for uncut areas by means of a window in a screen in the 4th step.

The method for defining machining areas of a workpiece of the present invention clearly displays uncut areas in a screen on a CRT and further displays candidate tools for the uncut areas.

BEST MODE FOR CARRYING OUT THE INVENTION

Hereinafter, embodiments of the present invention will be explained in detail referring to the accompanied drawings.

Figure 6:
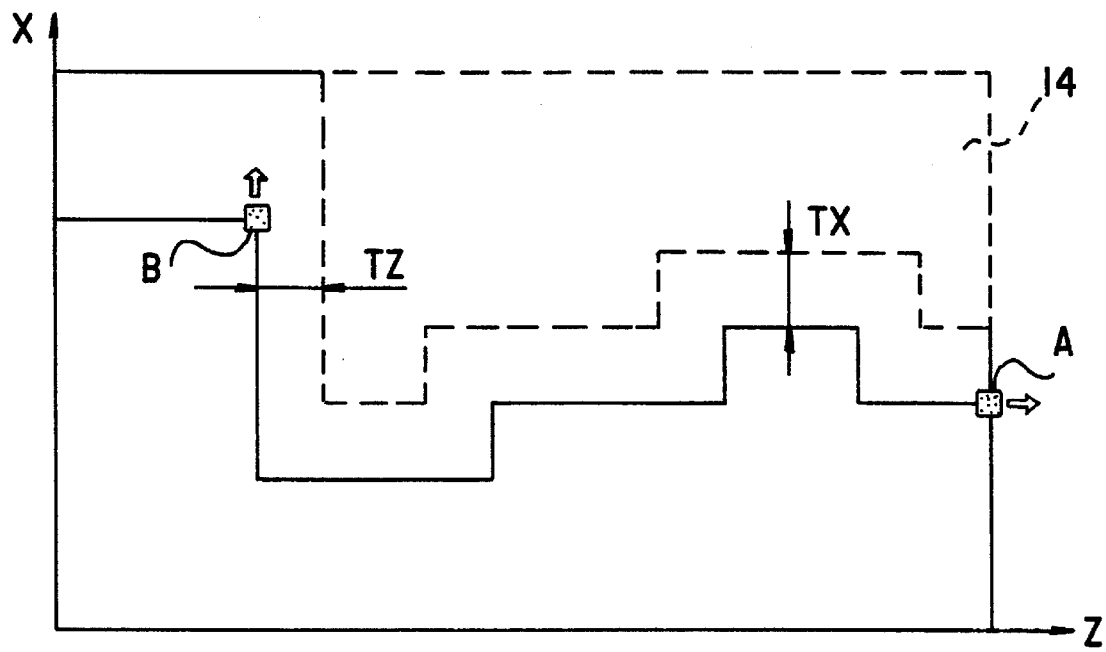
FIG. 6 shows a screen displaying a whole workpiece, a designated machining area and the shape of the workpiece after completion of the machining.

FIG. 6 shows a screen displaying a whole workpiece before machining, a designated area of the workpiece to be machined and the shape of the workpiece after completion of the machining. In the drawing, TX and TZ indicate the width of the finishing stock which is left after completion of the machining of a workpiece in the directions X and Z respectively, the continuous thick line indicates the designated machining area, the area added to the designated machining area by the finishing stock indicates the shape of the part after completion of the machining of the workpiece, and the area 14 surrounded by broken lines indicates the whole machining area. Black squares at points A and B indicate the points for designating the designated machining areas, and arrows at the points A and B indicate the cutter feed direction for machining the workpiece by tools.

Figure 7:
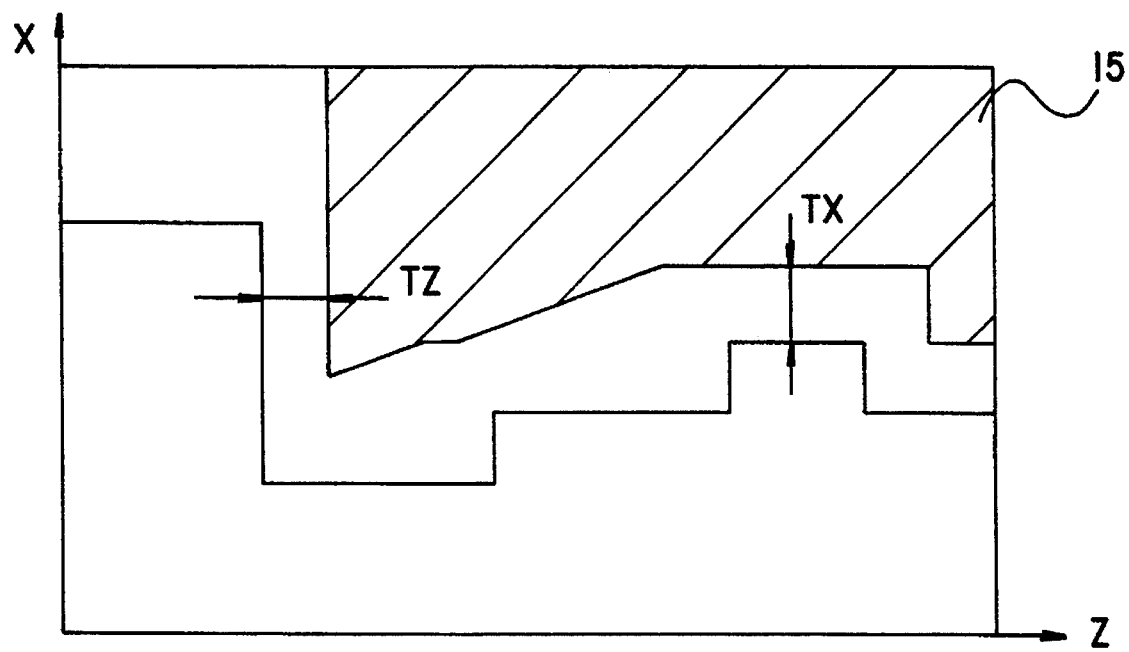
FIG. 7 shows a screen displaying a designated machining area and the shape of a workpiece to be machined by the designated tool No. 1.

FIG. 7 shows a screen displaying a designated machining area to be machined and the shape of a workpiece to be machined by the designated tool No. 1. In the drawing, each of TX and TZ indicate the width of the finishing stock in the directions of X and Z respectively. The shape of a part that can be obtained after completion of the machining of the workpiece is shown as the area adding the finishing stock to the designated machining area, but the real machining area 15 which will be machined by the designated tool No. 1 under a machining condition concerning the finishing stock is shown as the hatched area with oblique lines in the drawing. Uncut area can be found when operators compare the shape of the workpiece after completion of machining the designated machining area by the designated tool No. 1 with the shape of the part described above. In order to finish the machining to obtain the desired shape, it is necessary to find out the uncut area by comparing the drawings 6 and 7, to select another tool for machining the uncut areas. It is an object of the present invention to allow an operator to clearly see the uncut area in a screen.

Figure 8:
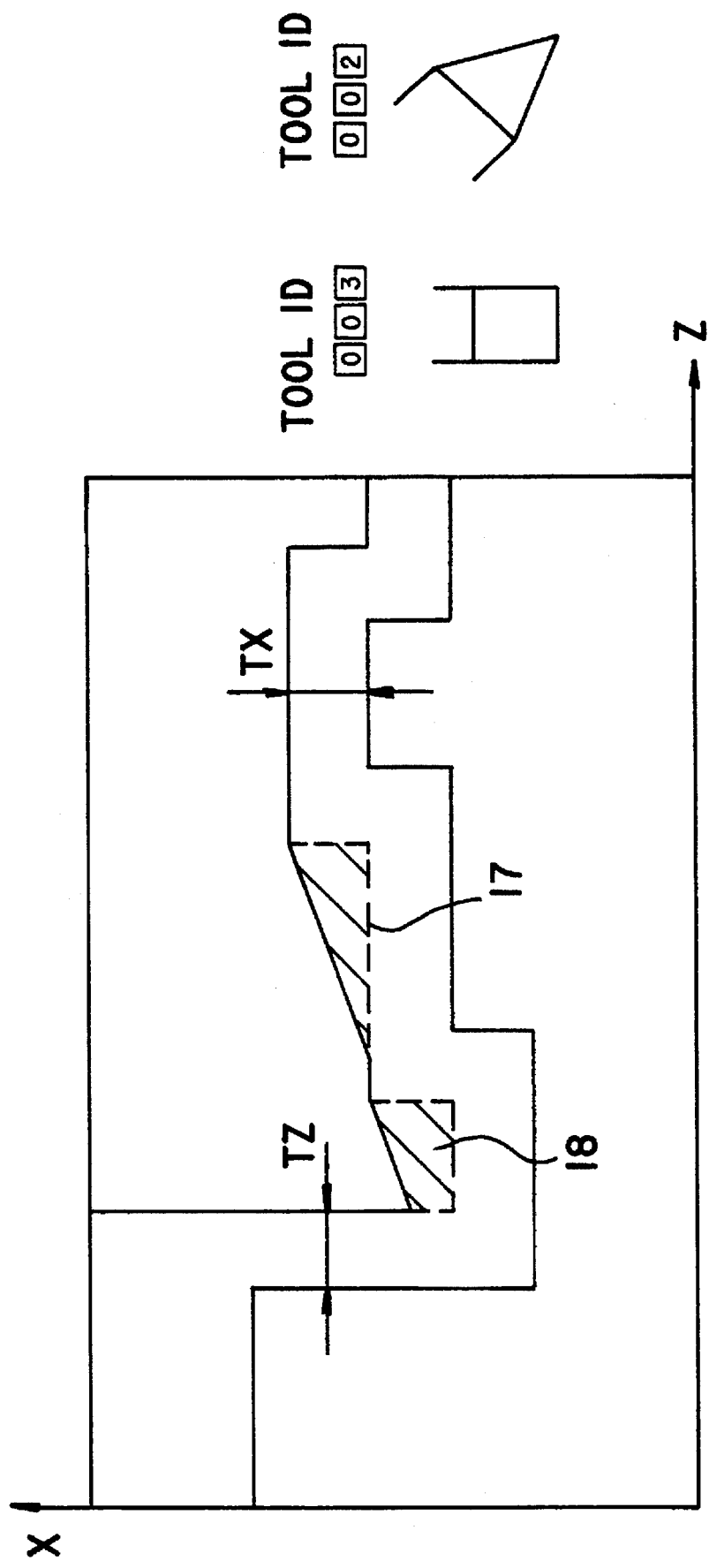
FIG. 8 shows a screen displaying overlapped view of the screens of FIG. 6 and FIG. 7.

FIG. 8 shows a screen displaying overlapped view of the screens of FIG. 6 and FIG. 7. In the drawing, the shape drawn with a thick continuous line indicates the designated machining area, the shape drawn with a thin continuous line indicates a real machining area to be machined by the designated tool No. 1 and the hatched areas with oblique lines indicate uncut areas after completion of the machining of the workpiece by the designated tool No. 1. This uncut area in the screen can be more clearly shown by selecting line attributes such as a continuous line, a broken line or the like, or colors of lines, or colors or raster patterns for drawing in areas surrounded by lines. Therefore, the tool which should be used next can be easily selected when an operator looks at the screen. Furthermore, as shown in the same drawing, for example, the candidate tool for the next operation can be shown by means of a window. Accordingly, it can be easily determined with reference to the screen shown in FIG. 8 that the uncut area 17 indicated with oblique lines on the right side must be machined with the tool ID No. 002 and that uncut area 18 indicating with oblique lines on the left side must be machined with the tool ID No. 003.

Figure 9:
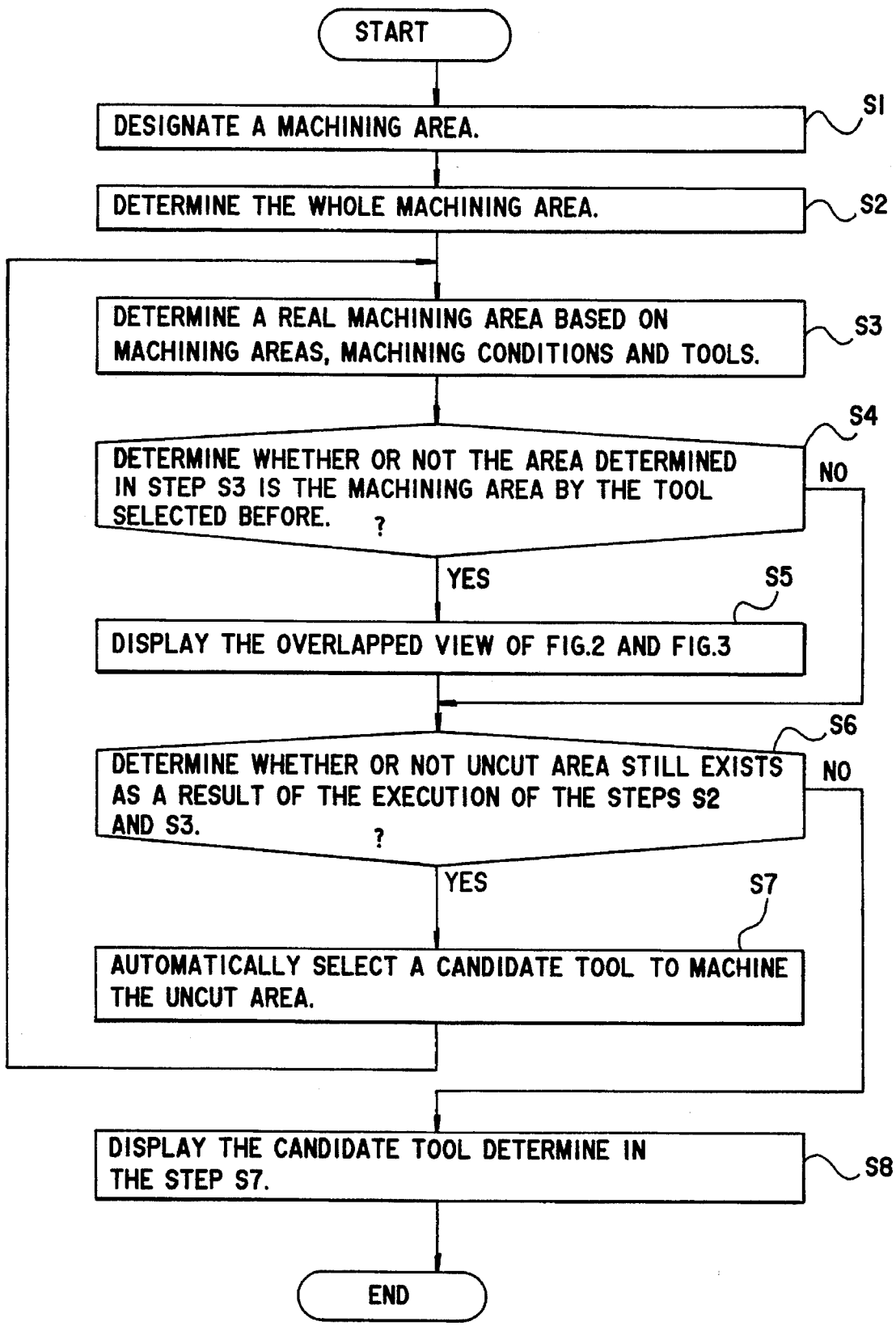
FIG. 9 shows a flow chart of a process of a method for defining machining areas of a workpiece according to an embodiment of the present invention.

FIG. 9 shows a flow chart of a process for defining machining areas of a workpiece according to an embodiment of the present invention. The flow chart will be explained in the following. In the drawing, the number after S indicates step numbers.

Initially, a machining area is designated (step S1). In practice, as shown in FIG. 6, the machining area with black squares at points A and B is designated, then a cutter feed direction for machining the workpiece by arrow marks at the points A and B is designated.

Then, the whole machining area 14 surrounded by broken lines is determined (step S2). In practice, as shown in FIG. 6, the width of finishing stocks TX and TZ in the direction of X axis and Z axis respectively is determined.

Then, a real machining area 15 indicated by hatching with oblique lines in FIG. 7 which will be really machined by the designated tools under a machining condition concerning the finishing stocks of TX and TZ is determined (step S3).

Figure 1:
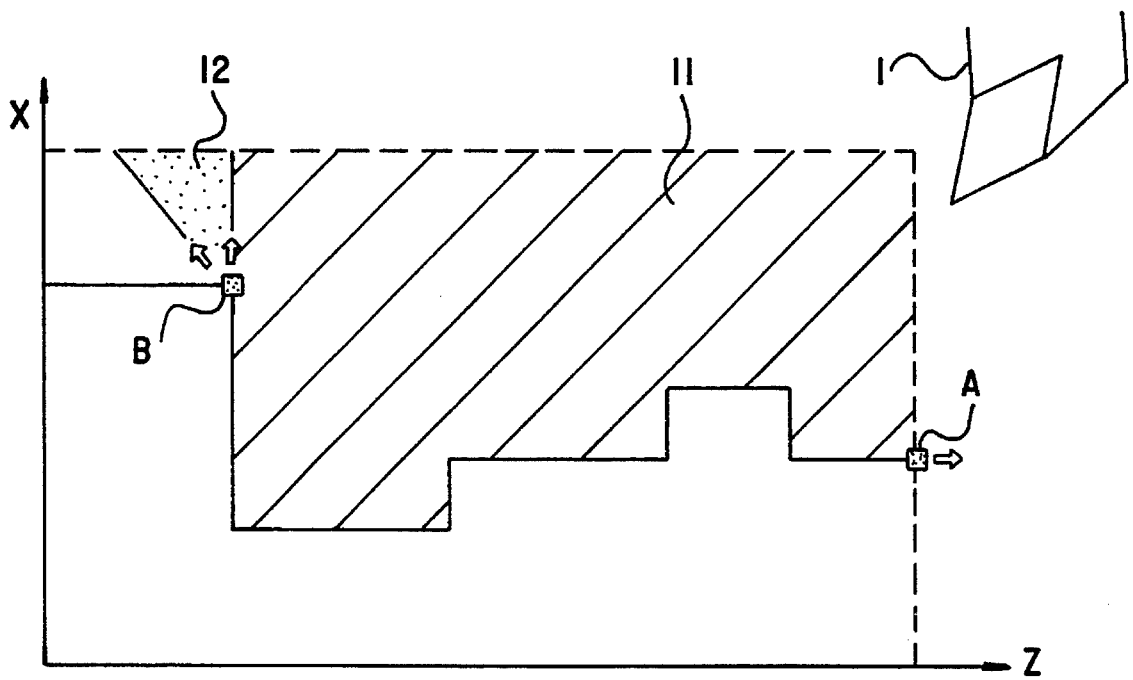
FIG. 1 shows a screen displaying the shape of a whole workpiece and a designated machining area in the workpiece.
Figure 2:
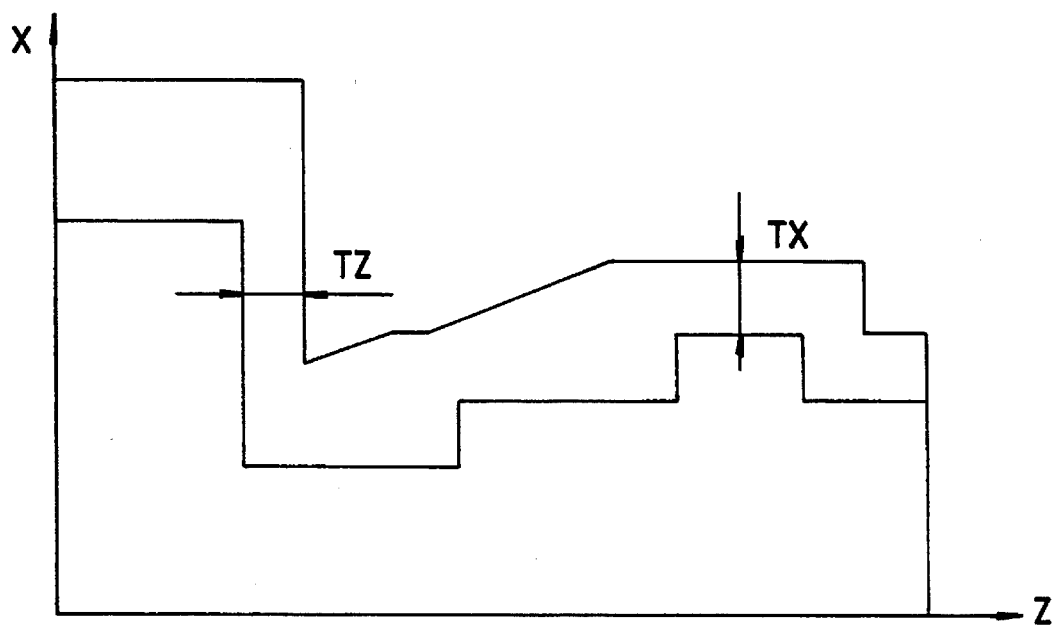
FIG. 2 shows a screen displaying a designated machining area and an outline of a workpiece before machining the workpiece by a designated tool No. 1.
Figure 3:
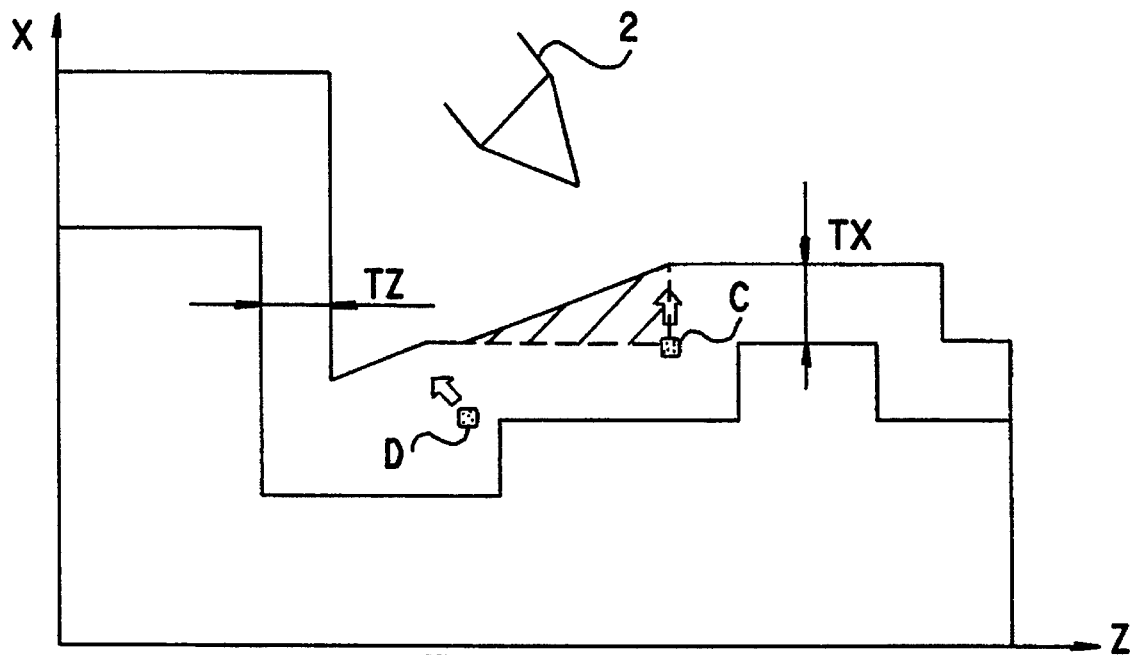
FIG. 3 shows a screen displaying a designated machining area of a workpiece after completion of the machining by the designated tool No. 1 and the shape of the machining area to be machined by the designated tool No. 2.
Figure 4:
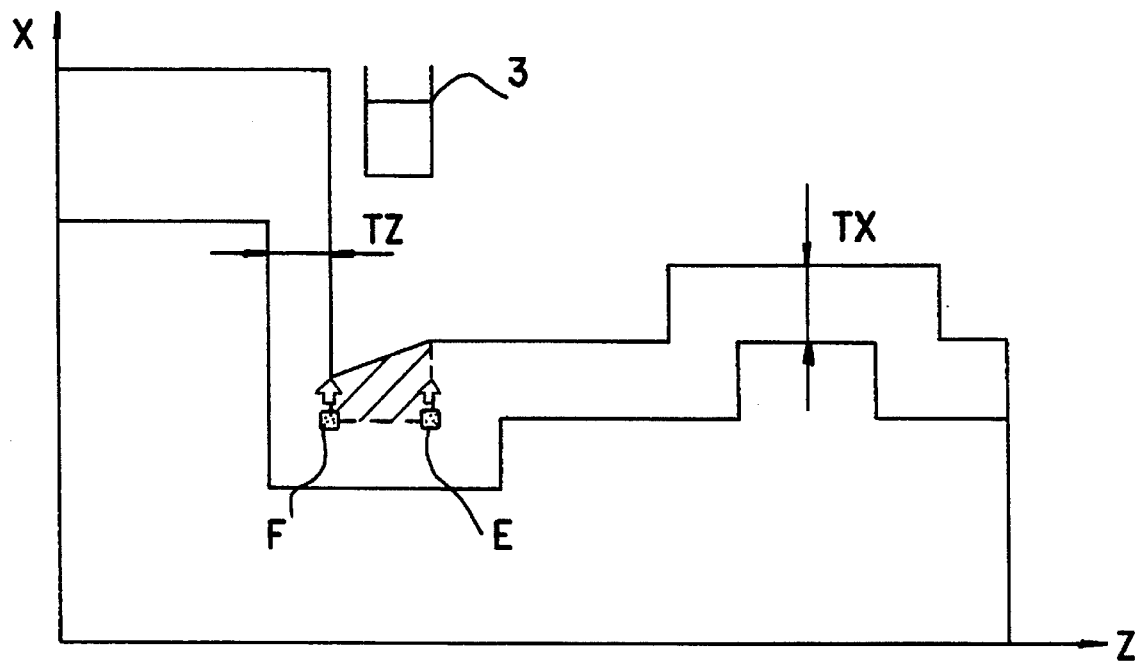
FIG. 4 shows a screen displaying a designated machining area of a workpiece after completion of the machining by the designated tools No. 1 and No. 2, and the shape of the machining area to be machined by the designated tool No. 3.
Figure 5:
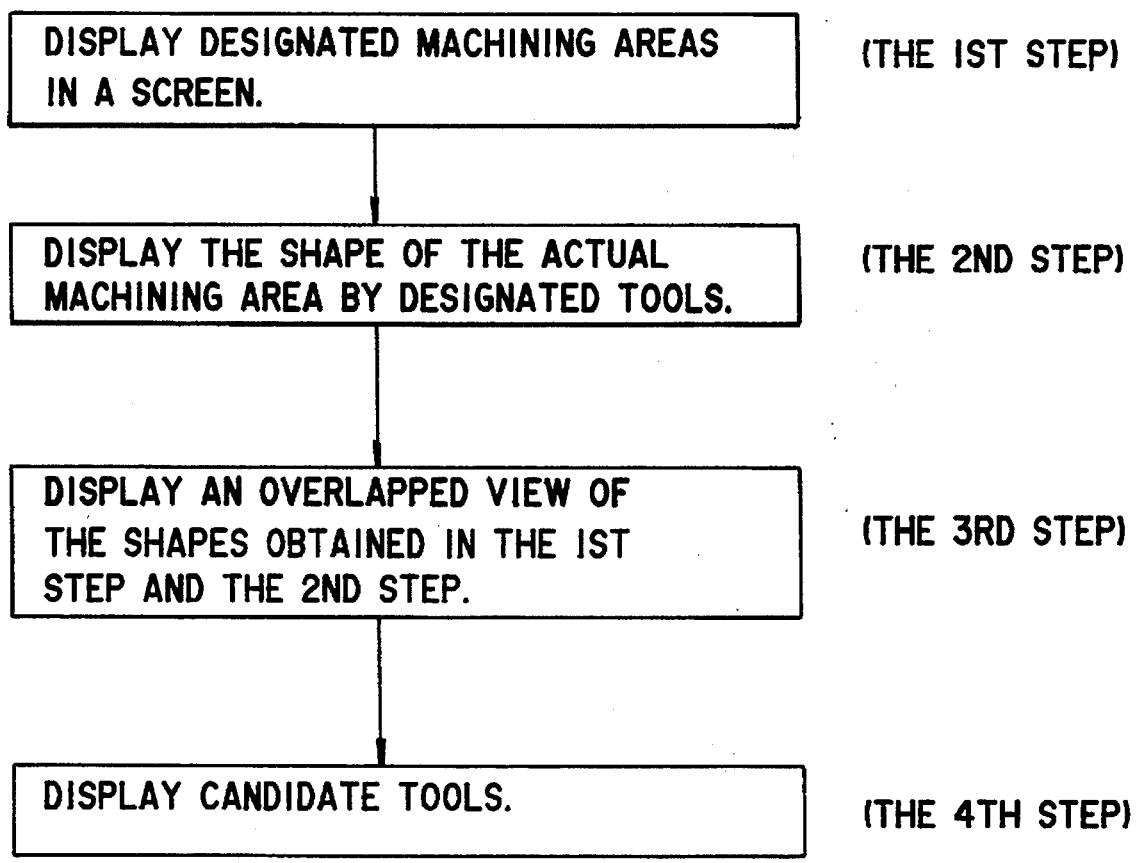
FIG. 5 shows a flow chart of a basic process of a method for defining machining areas of a workpiece according to the present invention.

Then, whether or not the real machining area 15 determined in step S3 is the machining area with the tool selected for the first time is determined (step S4). If the decision is YES in the step S4, the area obtained in the steps S2 overlapped with the area obtained in the step S3 is displayed (step S5). Namely, the overlapped view of FIG. 2 and FIG. 3 is displayed. If the decision is NO in the step S4 or after executing the step S5, whether or not uncut area still exists, after inspecting the areas obtained by the execution of the steps S2 and S3 is determined (step S6). If an uncut area is found, a candidate tool to machine the uncut area is automatically selected, and control returns to step S3 (step S7). Then step S3 is executed, and it is determined whether or not the machining area obtained in the step S3 is the area for machining by the tool selected for the second time in the step S4 and, if so, execute the steps S5, S6 and S7, and repeat the execution of steps from S3 to S7 until no uncut area can be found. Step S8 is executed when it is determined that an uncut area can no longer be found in the step S6, and the candidate tool determined in the step S7 is displayed (step S8).

As heretofore explained, according to the method for defining machining areas of a workpiece, uncut areas become obvious because a whole workpiece shape, a designated machining area, the shape of the workpiece after completion of the machining for the designated machining area by the designated tool, and the uncut area, can be shown as an overlapped view in a screen. The selection of tools for machining becomes easy because the method provides a display for a candidate tool suitable for the next machining operation, thus the time necessary for defining machining areas of a workpiece is reduced.

We claim:

1. A method for defining machining areas of a workpiece by means of a CRT screen display in an interactive computer system for creating a program for numerical control machining comprising the steps of:

a) prior to programming a step of machining of the workpiece, providing a first CRT screen display showing the whole workpiece before machining including representations of an entire designated area of the workpiece to be machined in the present machining operation and the final shape of the workpiece after completion of machining;

b) providing a second CRT screen display identifying a first area of said workpiece to be machined by a designated tool No. 1 in a first machining operation;

c) after programming of said first machining operation by an operator, providing a third CRT screen display representing overlapping views of said first and second CRT screen displays and further identifying all uncut designated machining areas of said workpiece required to be machined by further machining operations requiring further programming by the operator; and d) checking, in accordance with the result of the displayed overlapping views, whether uncut areas exist and, if so, displaying an identification of all uncut areas together with candidate tools for machining each uncut area identified.

2. A method for defining machining areas of a workpiece by means of a CRT screen display in an interactive computer system for creating a program for numerical control machining comprising the steps of:

a) prior to programming a step of machining of the workpiece, providing a first CRT screen display showing the whole workpiece before machining including representations of an entire designated area of the workpiece to be machined in the present machining operation and the final shape of the workpiece after completion of machining;

b) providing a second CRT screen display identifying a first area of said workpiece to be machined by a designated tool No. 1 in a first machining operation;

c) after programming of said first machining operation by an operator, providing a third CRT screen display representing overlapping views of said first and second CRT screen displays and further identifying all uncut designated machining areas of said workpiece required to be machined by further machining operations requiring further programming by the operator, wherein each designated machining area and outlines of present and future surfaces of said workpiece are identified in the CRT screen displays by specific characteristic representations so that each separate machining operation can be easily distinguished; and d) wherein in said CRT screen displays a final shape of the finished workpiece represented by a continuous heavy line, displays a present shape of said workpiece represented by a continuous thin line, displays an outline of a designated machining area represented by a dash line, and displays material to be removed by machining represented by a hatched area.

3. The method set forth in claim 1 wherein candidate tools for machining uncut areas are displayed by means of a window in the CRT screen display.

* * * * *